US007653570B2

(12) United States Patent
May

(10) Patent No.: US 7,653,570 B2
(45) Date of Patent: Jan. 26, 2010

(54) SYSTEMS AND METHODS FOR INTELLIGENT COMMUNICATING STORAGE OF CONDITION MONITORABLE REPLACEABLE COMPONENTS

(75) Inventor: Jerome E. May, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 813 days.

(21) Appl. No.: 11/091,377

(22) Filed: Mar. 29, 2005

(65) Prior Publication Data

US 2006/0224472 A1 Oct. 5, 2006

(51) Int. Cl.
*G07G 1/00* (2006.01)
*G03G 15/00* (2006.01)
(52) U.S. Cl. .......................................... 705/14; 399/111
(58) Field of Classification Search .................... 705/14; 399/111
See application file for complete search history.

(56) References Cited

U.S. PATENT DOCUMENTS

| 5,802,015 | A * | 9/1998 | Rothschild et al. ............ 368/10 |
| 6,351,621 | B1 * | 2/2002 | Richards et al. ............. 399/111 |
| 6,491,217 | B2 * | 12/2002 | Catan .......................... 235/375 |
| 6,758,397 | B2 * | 7/2004 | Catan .......................... 235/385 |
| 6,817,757 | B1 * | 11/2004 | Wallace ....................... 374/120 |

OTHER PUBLICATIONS

"A universal approach to hot-swapping power in telecommunication systems" to Bob Neidorff, EDN; Mar. 4, 2004; 49, 5; ABI/INFORM Global, p. 59.*

* cited by examiner

*Primary Examiner*—Matthew S Gart
*Assistant Examiner*—Garcia Ade
(74) *Attorney, Agent, or Firm*—Oliff & Berridge, PLC

(57) ABSTRACT

An intelligent communicating supply storage unit is provided, tailored to storing one or more replaceable components for one or more supply-consuming devices. The storage unit may provide capabilities: (a) to sense a presence or absence of replaceable components for associated devices, which may include determining that the correct components are available, and to monitor a status of an internal characteristic of a stored replaceable component by accessing information stored on an externally readable component monitoring module attached to the stored replaceable component; (b) to maintain an updated inventory of the status of supplies on hand to include introduction of supplies into the storage unit for storage, and removal of supplies from the storage unit for use of disposal; and/or (c) to communicate storage unit supply status or inventory from the storage unit to an external source such as, for example, a supply providing organization.

20 Claims, 2 Drawing Sheets

SYSTEMS AND METHODS FOR INTELLIGENT COMMUNICATING STORAGE OF CONDITION MONITORABLE REPLACEABLE COMPONENTS

BACKGROUND

This disclosure is directed to systems and methods for monitoring inventory status of replaceable components, associated with a machine or device, which include electronically-readable monitor modules for monitoring of at least one variable, yet measurable, characteristic of the replaceable component.

Many devices in common use today include replaceable components. These replaceable components often include an externally or remotely electronically-readable monitoring module for monitoring one or more characteristics regarding the replaceable component. Such characteristics can include static information, i.e., information that does not change over the life of the component, such as a model or serial number. The monitoring module can also be used to record, in an electronically-readable format, dynamic information relating to a particular characteristic of the replaceable component which may change over time. Such dynamic information includes, for example, information on use, maintenance, failures, diagnostics, remanufacture, and remaining service life. Often such a monitoring module is connected, via wired or wireless connection, to a graphical user interface (GUI) associated with the device in which the replaceable component is installed. The intent of providing such a capability is that any customer, end-user, field-service representative or other individual available and capable of replacing the replaceable component may be alerted to a need to accomplish such replacement, or preferably may be alerted early to pending status which will define a need for replacement in the near future based on information such as, for example, remaining service life of the individual replaceable component. Appropriately exploiting this information, however, requires that an individual assess the information presented on the GUI and then respond appropriately.

Despite available GUI warning messages, however, often devices experience unanticipated shutdowns due to an unrecognized or uncorrected pending or actual "end of life" condition of one or more replaceable components, all alerts to such impending conditions having gone unheeded by available personnel. In certain industries, such shutdowns occur at a notable rate causing customers or other end-users to incur substantial expense in requiring expedited servicing, and/or immediately fillable orders for replacement components, to replace the expended components, or simply through loss of revenue based on lack of availability of critical replaceable components at both the point and time of need, thereby taking the device out of service for some, possibly extended, period of time until replacement components are received and installed. This problem is particularly acute in the case of certain long-life replaceable components because immediate availability of such components is decreased over those demanding more frequent replacement based on the nature of such components. It may be advantageous to provide a system that may lower average inventory costs by "predicting" the complete exhaustion of components, based on tracking of the replacement rate (units per month, for example) and, in the case of a service organization, provide a pointer to a "nearest available component" to a service person in the event that a nearby machine has a component which is in need of replacement, but a replacement may not be immediately on hand. This minimizes the cost (in time and transportation expense) of the service person traveling to a centralized parts depot to obtain the needed component.

External, particularly supplier-based, monitoring of available on-hand inventories of replaceable components at end-use sites is, therefore, advantageous. Such a capability allows a supplier to independently monitor the status of customer and/or field replaceable components in order to bridge the gap in ensuring that the on-hand supply of critical replaceable components meets the availability required at the point and time of need without unnecessarily burdening the customer or end-user sites with a need to maintain excessive supplies of such replaceable components.

Systems exist for providing rudimentary on-site inventory and replaceable component status monitoring. For example, U.S. Pat. Nos. 6,491,217 and 6,758,397 to Catan disclose machine-readable label (MRL) reader systems for articles, to include articles with a "changeable" status. In these systems, a changeable description of an article labeled by an MRL is tracked, using a unique code in the MRL correlated with certain descriptive information about the article including some possibly changeable information, a record of which is available through manual update of the MRL. U.S. Pat. No. 6,817,757 to Wallace discloses a system and method for monitoring food information in a food service facility wherein a plurality of remote sensor units may be installed in a food receptacle to gather temperature or other food data from multiple sources, the collected data being transmitted to a central computer.

Both Catan and Wallace disclose a capability to read static and/or manually updated information regarding on-hand inventories of some commodities including food. A drawback to such systems as are disclosed in Catan and Wallace is that when the level of the contents within a container changes, or the nature of the contents within a container changes, or other like conditions regarding a container change, interaction by a supplier or a user is required to update the information on a label, MRL or other "readable" tag. The mere presence or absence of a component in a storage position, which is the main objective of such automated inventory management systems, does not capture any knowledge about a condition of the stored components or inventory.

Many industries that have implemented systems and methods such as those described above for basic inventory and replaceable status monitoring on-site have incorporated a next step. This next step involves extending the on-site monitoring capability by incorporating, within their devices, an ability to transmit the internally monitored information described above externally to a network. Transmitted monitoring information may then be available for remote call-up such as, for example, as part of a remote and/or off-site diagnostic access to the status of the device in order that the "health" of the components operating within the device can be monitored. Often, however, such monitoring involves little more than an ability to read binary or on-off "fault flags" that have been set by the device, internally generated based on the device's ability to read a condition of a component and to determine whether it is "good" or "bad." This intervening step simplifies the externally transmitted information, but may leave the receiving node lacking critical information as to the status of the device or components housed within the device.

Examples of such externally monitorable devices include various types of electronic office equipment, particularly image forming devices, such as those disclosed in, for example, U.S. Pat. No. 6,351,621 to Richards et al., which is commonly assigned and the disclosure of which is incorporated herein in its entirety by reference. Richards discusses replaceable components in the context of Customer Replaceable Units ("CRUs") which routinely include electronically-readable chips containing static information for identification of the CRU, and/or dynamic information relating to a particular CRU's operating status. The dynamic information may include a fill level, number of uses expended, or other indication of projected service life remaining. Richards explains that when an individual CRU is installed in the disclosed modularly designed office equipment, a communication interface is established with the electronically-readable chip as a component status monitoring module located within, or externally mounted to, a CRU. Such a monitoring module enables the office equipment to monitor a characteristic of the replaceable modular component by reading data from, and potentially updating the information contained by writing data to, the monitoring module. Richards refers to such electronically-readable chips as Customer Replaceable Unit Monitors ("CRUMs").

Richards explains that the business office device within which the CRU is installed, powers and communicates with the CRUM, through wired or wireless communication, in order that the device is updated on at least a routine basis with the status of the CRU which operates within the device. It is just such information which is often available via a GUI as either routine status information, or when, for example, remaining service life reaches predetermined critical values, warning messages regarding impending system failure and/or shutdown.

Accordingly, conditions such as "new" or "exhausted" are easily determinable as are a more detailed continuum of states or conditions ranging, for example from "unused" thru "partially consumed" to "exhausted." More detailed condition monitoring yet may detect states such as, for example, "damaged" and/or "unusable." Certain of these states or conditions are monitored by "smart" component monitors such as, for example, CRUMs, in order that the component monitor "knows" something about the component's condition.

In printer and/or other image forming devices, systems for communicating with and/or remotely diagnosing the status of widely dispersed devices are well known, as they are in other technology areas. These systems communicate via any manner of wired or wireless communications with network interfaces such as, for example, via telephone lines, local area networks, and/or the Internet, in order to provide, for example, a remote service center with access to the device in order to read status and/or diagnostic information produced by the device. Remote and widely dispersed access is thus implemented such that an operator, supplier, diagnostic technician or other individual whose duties may require access to information regarding the status of the device, or any replaceable component operating therein, can review the information.

SUMMARY

There are, however, situations in which a customer or other end-user operating a device would prefer that access to that device not be made so freely available via any wired or wireless communication which has the potential to provide electronic access directly to the machine or device, such as, for example, over a telephone line or via the Internet. Such concern is often most pronounced when the end-use device involves data or image production, reproduction and/or transmission, such as from a multi-function device, printer, copier, facsimile machine or other such business office device.

There is a class of customers and/or other end-users that may be concerned that the data and images that they produce and/or reproduce within their facility may be potentially acquirable by others via some "open" network access to the devices.

Exemplary systems and methods according to this disclosure address the above-described shortfalls associated with available end-use machines or devices.

Exemplary embodiments of disclosed systems and methods may provide an intelligent communicating supply storage unit, such as, for example, a cabinet or room within a facility, tailored to one or more replaceable components for one or more supply-consuming devices. The intelligent communicating supply storage unit may provide capabilities: (a) to sense a presence or absence of supplies for devices which the storage unit is intended to support, which may include an ability to determine that the correct supplies are available, and additionally to monitor a status of at least one internal characteristic of such stored replaceable components by accessing information stored on an externally readable component monitoring module housed in, externally mounted to or otherwise associated with each individual stored replaceable component; (b) to maintain an updated log, list or other appropriate inventory of the status of the supplies on hand, to include, but not be limited to, introduction of replaceable components into the storage unit for storage, and removal of replaceable components from the storage unit for use or disposal; (c) to communicate storage unit status data to an external source or receiving node such as, for example, a supply providing organization; (d) to reduce customer sensitivity to a potential for an external communications link to provide unauthorized access to customer and/or end-user product information, particularly produced and/or reproduced data and/or images; and/or (e) to potentially communicate with the devices for which the storage unit is intended to store supplies in order to monitor supply status of replaceable components in use in addition to those in inventory, and further, to potentially anticipate problems arising between device supply requirements and an ability of on-hand supplies within the storage unit to support those requirements.

Exemplary embodiments of disclosed systems and methods may provide an intelligent communicating supply storage unit that stores a readily available inventory of replaceable components, each component including at least one externally readable component monitoring module which stores information regarding at least one characteristic of the replaceable component which is of interest to a customer, user, supplier, or other individual to whom such information may be provided. Such information contained in the externally readable component monitoring module may be static, i.e., not changing over the life of the component monitoring module, such as, for example, a model or serial number, or dynamic, i.e., changing with use of the component, such dynamic information being automatically updateable within the component monitoring module itself, and including, for example, information regarding use, maintenance, failure, diagnostics, remanufacture and/or remaining service life.

Exemplary embodiments of disclosed systems and methods may provide an ability to read replaceable component information from an externally readable component monitoring module contained in or attached to a replaceable component via a component monitoring module data interface which enables communication with the component monitoring module associated with each stored replaceable component, and facilitates reading data from, and/or writing data to, the component monitoring module.

Exemplary embodiments of disclosed systems and methods may provide an ability to power the component monitor modules in the stored replaceable components via wired and/or wireless links between a component monitoring module power interface and individual power sources within each component monitoring module associated with a stored replaceable component.

Exemplary embodiments of disclosed systems and methods may provide an ability for bi-directional communication of at least one of storage unit status information or stored replaceable component status information to an external source via an external electronic information communications interface. The external communications interface may be appropriately compatible with an external electronic information communications receiver such as, for example, a telephone line, a network interface, an Internet communications interface, and/or other like data communications capability, wired, wireless, optical or any combination thereof.

Exemplary embodiments of disclosed systems and methods may provide clock and calendar functionality and/or an ability to sense changing storage unit status. Update of the status of the supply of on-hand replaceable components, and at least one electronically-monitorable characteristic of each of those components may then be automatically retrievable on a timed basis and/or separately based on any sensed change in storage unit status. Such change in storage unit status may include, for example, where the storage unit may comprise a cabinet, an ability to sense when a cabinet door or lid is opened and/or closed. On sensing such a change, automatic update of the status of the cabinet and the replaceable components stored in the cabinet may be automatically accomplished.

Exemplary embodiments of disclosed systems and methods may provide an ability to write data regarding storage unit status such as, for example, location, date, and/or other relevant information to a component monitoring module associated with a stored replaceable component via the component monitoring module data interface. Such information may be stored in a data storage device within the storage unit, and/or may be user updateable through a user-interface such as, for example, a local GUI, or updateable from a remote node via an external electronic information communications transmitter which is compatible with a bi-directional external electronic information communication interface.

Exemplary embodiments of disclosed systems and methods may provide capability for a storage unit to interact with one or more end-use devices with which the storage unit may be associated. Such interaction may facilitate, for example, monitoring status of supply usage within the end-use device thereby updating, on a routine or on-call basis, an overall status of on-hand and in-use inventories of replaceable components within the facility within which the supplies of replaceable components and end-use devices are located.

Exemplary embodiments of disclosed systems and methods may support customer replaceable units within business office devices and/or image forming equipment, such as, for example, xerographic image forming devices, with which the storage of externally monitorable customer replaceable components is associated, in order that customer or end-user sensitivities regarding directly linking a data or image production, reproduction and/or transmission device to an externally readable or otherwise potentially randomly accessible electronic information gathering source may be minimized. Functional separation between the storage unit and end-use devices or machines is an advantage of the systems and methods according to this disclosure. Such functional separation is intended to create an information firewall between the end-use device and the external communications capability of the storage unit. This functional separation need not include physical separation from the end-use device.

Exemplary embodiments of disclosed systems and methods may assist customers and/or other end-users, as well as servicing and supplying organizations, in reducing expenses incurred by generating, and/or responding to, immediate, emergency or otherwise unscheduled "out of consumables" calls or requirements. Exemplary embodiments may support additional advantages of providing organizational tracking of supply consumption, added security through an ability to monitor supply movement into and out of the storage unit and reasonable feedback of, for example, lead times and/or storage times of individually supplied replaceable components.

Exemplary embodiments of disclosed systems and methods may provide a capability whereby not only is an inventory of containers within a storage unit maintained, but status of at least one characteristic of the contents of the containers is read, maintained, updated and/or stored, all of this information being externally and/or remotely communicatable on a scheduled basis and/or on-call as desired by some receiving mode.

These and other features and advantages of various disclosed embodiments are described in, or apparent from, the following detailed description of various exemplary embodiments of systems and methods according to this disclosure.

BRIEF DESCRIPTION OF THE DRAWINGS

Various exemplary embodiments of systems and methods according to this disclosure will be described, in detail, with reference to the accompanying figures, wherein.

DETAILED DESCRIPTION OF EMBODIMENTS

The following detailed description of various exemplary embodiments of systems and methods describes intelligent communicating supply storage unit usable for monitoring available, and potentially in-use, supplies of replaceable components. Each replaceable component contains at least one component monitoring module with which the storage unit is able to establish bi-directional communication. The replaceable components may be referred to, hereafter, for convenience, as customer replaceable units ("CRUs") for an image forming device. Each CRU will be understood as containing a customer replaceable unit monitor ("CRUM") as an externally readable chip installed in the CRU to provide static and/or dynamic information regarding characteristics, configuration and/or other details of the CRU within or upon which the CRUM installed. However, the principles disclosed and described regarding the exemplary embodiments in this disclosure are applicable to substantially any system or method that monitors characteristics of an end-user or otherwise on-site replaceable component for a device particularly those of modular design, in virtually any application where an on-hand supply of replaceable components is advantageously maintained and optimized. The externally readable monitoring devices contemplated are those that are generally designed to provide static and/or dynamic information regarding a characteristic of the replaceable component in order that a supply inventory can be automatically remotely monitored and/or updated, and/or resupply can be initiated prior to the available on-hand supply of one or more such remotely monitorable replaceable components being exhausted.

Figure 1:
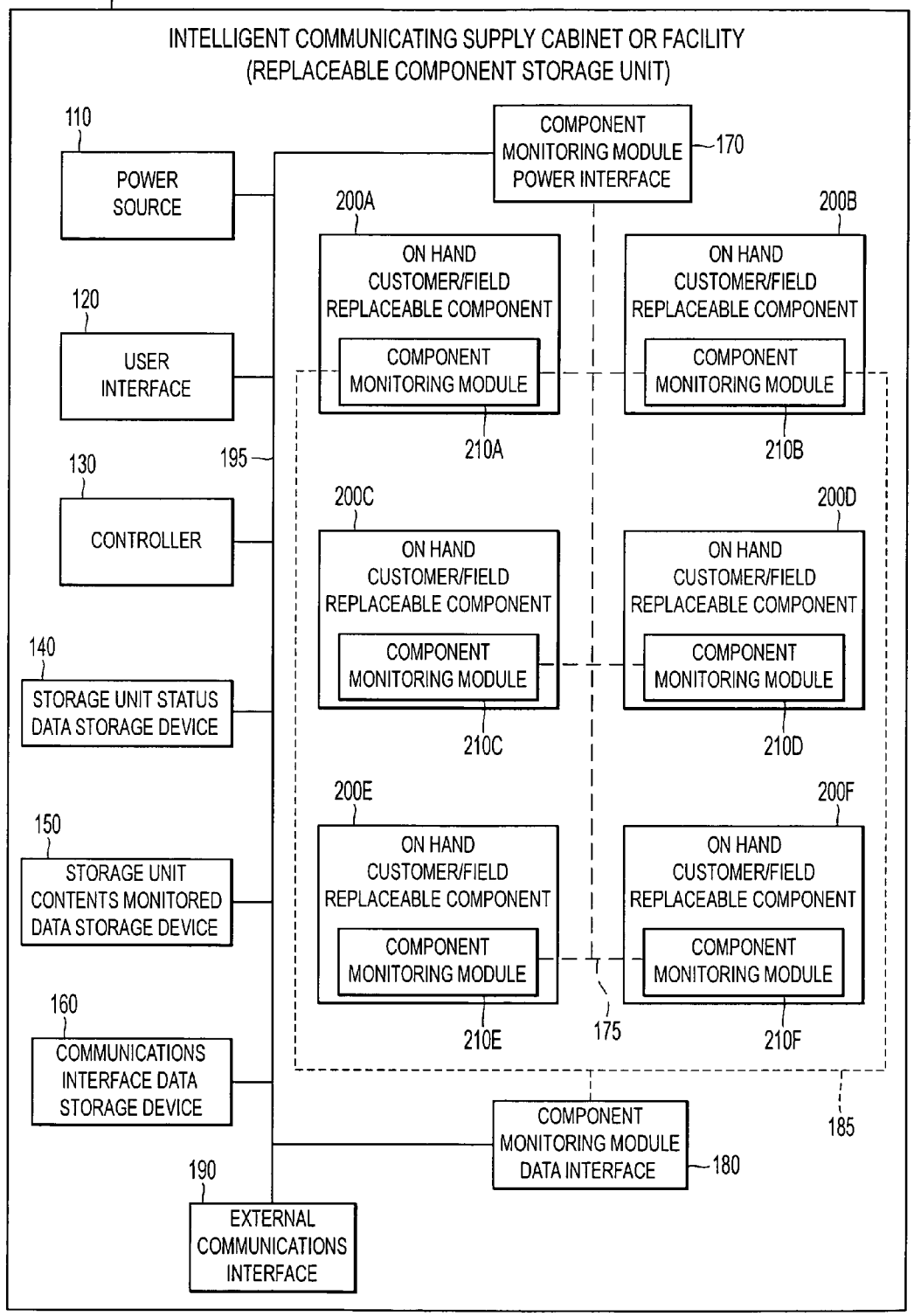
FIG. 1 illustrates a functional block diagram of an exemplary embodiment of an intelligent communicating supply storage unit.

FIG. 1 illustrates a functional block diagram of an exemplary embodiment of an intelligent communicating supply storage unit 100 according to exemplary systems and methods of this disclosure.

As shown in FIG. 1, an exemplary intelligent communicating supply storage unit 100 is available to store a plurality of replaceable components 200A-F. Each of the replaceable components 200A-F includes at least one component monitoring module 210A-F. These component monitoring modules 210A-F may include an externally powerable, or internally powered, and externally readable device for storing information regarding at least one characteristic of the replaceable component. Such information contained in the externally readable component monitoring module may be static, i.e., not changing over the life of the component monitoring module, such as, for example, a model or serial number of the replaceable component; or dynamic, i.e., changing with use of the component, such dynamic information being automatically updateable within the component monitoring module itself, and including, for example, information regarding use, maintenance, failure, diagnostics, remanufacture and/or remaining service life.

It should be appreciated that the specific configuration of an exemplary storage unit 100 is not critical nor does it need to be specifically described. Virtually any open or enclosed space that can be wired with the monitoring and communications equipment as will be described in detail below is contemplated. Though alternately described as a cabinet, connoting a less-than-room-sized container such as, for example, a locker, a foot locker, or any other closed or semi-closed unit or even open bookshelf or other set of shelves, or alternately referred to as a facility, connoting at least one room sized area within a larger facility, the floors, walls and/or ceiling of such room including the monitoring components disclosed herein, exemplary embodiments of an exemplary storage unit 100 as described in this disclosure are not limited to any specific mechanical configuration or size. It is contemplated that the facility and/or cabinet that may comprise an exemplary storage unit 100 will be sized and configured to optimize the storage of on-hand replaceable components 200A-F, shown in exemplary manner in FIG. 1.

An exemplary storage unit 100 includes a power source 110. The power source 110 may be internal such as, for example, a generator, a battery pack and/or other compatible power source; or may be external, such as, for example, simply a wired or wireless connection to a local power supply within the facility within which an exemplary storage unit 100 is housed.

Exemplary embodiments of a storage unit 100 may include a user interface 120, a controller 130, a plurality of data or information storage units or devices, shown in exemplary manner in FIG. 1 as storage unit status data storage device 140, a storage unit contents monitored data storage device 150, and a communications interface data storage device 160, all connected by a data/control bus 195. The power source 110 may or may not be connected to the data/control bus 195 depending on configuration of the system. The user interface 120, where provided, is available to enable a local user to input and/or update information such as, for example, regarding location, identification, status, operating characteristics and/or other information for control and/or monitoring of an exemplary storage unit 100 and the individual electronic elements included in the system for monitoring and communication installed within or connected to an exemplary storage unit 100. The user interface 120 may include, for example, a graphical user interface (GUI) in order that information stored within any or all of the data storage devices 140, 150, 160 may be locally viewed. The GUI may also be associated with the external communications interface 190 detailed below.

An exemplary storage unit 100 may also include a component monitoring module power interface 170. The component monitoring module power interface 170 may be a stand-alone system, or as depicted, may be connected to a suitable power source 110 and/or other components for monitor and control of the storage unit 100, and the contents stored therein, via a data/control bus 195. The component monitoring module power interface 170 is useable to provide power to the individual component monitoring modules 210A-F by a wired connection such as, for example, a power bus 175 into which compatible connections on each of the replaceable components 200A-F may be, for example, plugged in, in order that the component monitoring modules 210A-F may receive power therefrom. Alternatively, the component monitoring module power interface 170 may be connected to power interfaces within each of the component monitoring modules 210A-F via a wireless power supply such as, for example, an air core transformer with a winding in the power interface 170 and a separate winding within each of the component monitoring modules 210A-F whereby the power interface 170 can power the component monitoring modules 210A-F. Other wireless options may include that the component monitoring module power interface 170 may comprise, for example, a light source, and each of the component monitoring modules 210A-F may include a compatible photovoltaic cell. Based on the above, it should be appreciated that any methodology whereby power can be transferred from an exemplary component monitoring module power interface 170 of an exemplary storage unit 100 to each of a plurality of component monitoring modules 210A-F housed within a plurality of replaceable components 200A-F, whether wired or wireless, is contemplated. Alternatively, each replaceable component monitoring module 210A-F may be powered by its own battery or the like. In this case, the component monitoring module power interface 170 may be omitted.

A component monitoring module data interface 180 usable to communicate uni-directionally or bi-directionally with each of the exemplary component monitoring modules 210A-F housed respectively within the exemplary stored replaceable components 200A-F may be provided within an exemplary storage unit 100. The component monitoring module data interface 180 is available to read information contained in each of the component monitoring modules 210A-F on a routine or on-call basis as may be directed by the controller 130. Routine or on-call reading of the information contained in each of the component monitoring modules 210A-F by an exemplary storage unit 100 may be initiated based on some clocking, calendaring or otherwise task scheduled basis, or as may be requested by a local user via an exemplary user interface 120 or by some remote node (not shown) via a command which is communicated to an exemplary storage unit 100 across an external communications link with the remote node that is compatible with, and passes information through, an exemplary external communication interface 190 as will be detailed below. As such, the component monitoring module data interface 180 may be connected to the data/control bus 195 or otherwise connected to the disclosed system within an exemplary storage unit 100 via wired or wireless connection.

Connection between the component monitoring module data interface 180 and each of the component monitoring modules 210A-F may be established via a wired interface 185 to which the component monitoring modules 210A-F are plugged in, as depicted in exemplary manner in FIG. 1. Alternatively, communication may be established between the component monitoring module data interface 180 and each component monitoring module 210A-F via a wireless system such as, for example, one which employs magnetic and/or electromagnetic fields to read data from, and optionally write data to, the component monitoring modules 210A-F contained within the exemplary stored replaceable components 200A-F. Such methodologies for wireless communication between a suitable interfaces and individual component monitoring modules are known and will not be further described.

An exemplary storage unit 100 also may include at least one external communications interface 190 which may or may not be connected directly to the data/control bus 195. The external communications interface 190 may provide a compatible communications link to at least one remote electronic information receiving unit, node, or station (not shown) located external to and potentially remotely from an exemplary storage unit 100, through this external communication interface 190, queries may be initiated by a remote node such as, for example, inventory queries may be made by a supplier in order that the supplier may monitor and optimize the available inventory of on-hand replaceable components based on current, detailed information regarding the supply of such exemplary replaceable components 200A-F stored within an exemplary storage unit 100. The external communication interface 190 may be appropriately compatible with an external electronic information communications receiver such as, for example, a telephone line, a network interface, an Internet communications interface, and/or other like data communications capability, wired, wireless, optical, or any combination thereof.

Further, as shown in FIG. 1, an exemplary storage unit 100 may also include provision for internal data storage in one or more data storage units or devices such as, for example, a storage unit status data storage device 140, a storage unit contents monitored data storage device 150, and/or a communications interface data storage device 160.

FIG. 1 depicts various components such as the power source 110, user interface 120, controller 130, storage unit data storage devices 140,150,160, component monitoring module power interface 170, component monitoring module data interface 180 and the external communications interface 190 as separate discrete units within a system for monitoring and reporting the status of an inventory of exemplary replaceable components 200A-F within an exemplary storage unit 100. It should be appreciated, however, that one or more of these elements may be combined with another device within the monitoring and communicating system of an exemplary storage unit 100, or may represent one or more separate devices such as, for example, individual stand-alone units providing the functionality described. Additionally, it should be appreciated that each of the individual data and/or information transfer and/or storage elements, may be implemented as a software algorithm, a hardware circuit or any combination of the two, either standing alone, or executed in combination with one another as a single software routine and/or hardware circuit which may be operated in serial or parallel modes.

Exemplary embodiments of disclosed systems and methods may implement data storage and associated devices through any appropriate combination of alterable, volatile or non-volatile, or non-alterable, or fixed, memory. The alterable memory, whether volatile or non-volatile, can be implemented using any one or more of static or dynamic RAM, a floppy disk and compatible disk drive, a writable or re-writable optical disk and compatible disk drive, known or later developed hard drive, a flash memory or any like data storage medium. Similarly, the non-alterable or fixed memory can be implemented using any one or more of ROM, PROM, EPROM, EEPROM, optical ROM disks, such as CD-ROM or DVD-ROM disks with an associated disk drive, or any other like fixed data storage medium.

Figure 2:
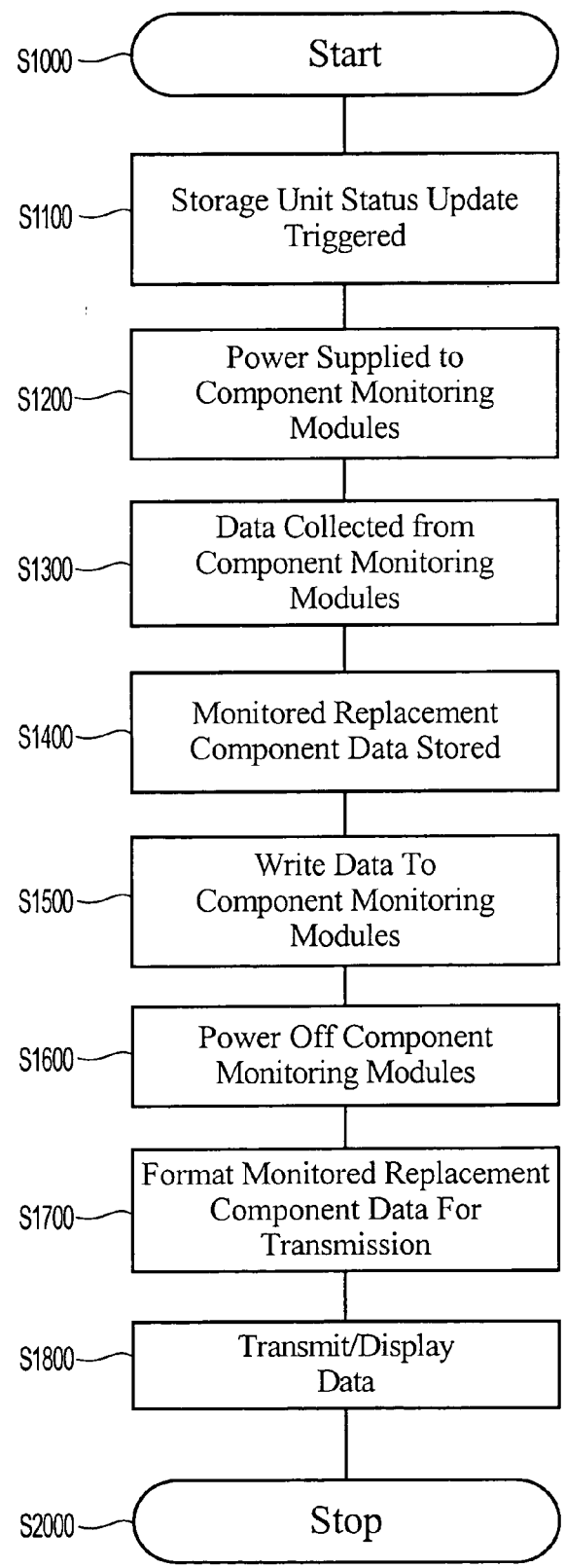
FIG. 2 is a flowchart outlining an exemplary method for monitoring and reporting a status of a supply of replaceable components contained in an intelligent communicating supply storage unit.

FIG. 2 is a flowchart outlining an exemplary method for monitoring and reporting a status of a supply of on-hand replaceable components individually containing at least one component monitoring module according to this disclosure. As shown in FIG. 2, operation of the method begins at step S1000 and continues to step S1100, where a storage unit inventory status update trigger is received. The trigger may be an inquiry from an remote node or other outside source via an external communications interface to the storage unit monitoring system, or a local inquiry by a local user via a graphical or other user interface with which the local user may communicate with the storage unit monitoring system of a replaceable component storage unit. Alternatively, an internally sensed change in status or condition of the storage unit may trigger the update, or a pre-scheduled trigger may be based on any of a clock time, calendar date or other such like input. When a storage unit inventory status update trigger is received in step S1100, the method proceeds to step S1200.

In step S1200, if required, a control signal is sent to a component monitoring module power interface in order that power may be supplied to a plurality of component monitoring modules housed within, attached to or otherwise associated with, each of a plurality of externally monitorable stored replaceable components in an on-hand inventory. The operation proceeds to step S1300.

In step S1300, a signal is sent from a component monitoring module data interface to each component monitoring module, and data regarding at least one static or dynamic characteristic of each of the stored replaceable components is read via the component monitoring module data interface. Operation then continues to optional step S1400, optional step S1500, and/or directly to step S1600.

In optional step S1400, collected component monitoring module data is optionally stored for later delivery or other non-real time use. Such non-real time use may include, but is not limited to, storage for later inventory assessment.

In optional step S1500, provision may be provided to optionally write data to at least one component monitoring module associated with at least one stored replaceable component. Such data may include, but is not limited to, data regarding storage unit status such as, for example, location, date, and/or other relevant information. Such information may be communicated to the component monitoring modules associated with each of the stored replacement components via a component monitoring module data interface.

In step S1600, power to individual component monitoring modules is turned off, if necessary or desired. Operation continues to step S1700.

In step S1700, collected inventory data is formatted as required to the capacity and capability of an external communications interface. Such external communications interface may include, but is not limited to, a local graphical interface or any available transmission capability whereby the data can be output to an external and/or remote site such as, for example, via a telephone line, a compatible network interface, an Internet communications interface and/or other like electronic information communications capability. The exterior communications connection may be wired or wireless, optical, or any combination thereof. Operation continues to step S1800.

In step S1800, inventory data is displayed and/or transmitted in response to an inquiry, on a timed basis or otherwise as required, to one or more requesting and/or reporting remote nodes such as, for example, a supply or resupply site in order that the monitored inventory data be made available for appropriate uses to include, but not be limited to, inventory monitoring and supply or resupply functions. Operation continues to step S2000, where the operation of the method stops.

It should be appreciated that, while disclosed systems and methods may have been described with exemplary customer replaceable units or CRUs associated with certain business office devices in mind, systems and methods according to this disclosure are not limited to such applications but may be applied to any supply situation where it would be advantageous to monitor the supply and internal status of on-hand replaceable components.

It should be further appreciated that while disclosed systems and methods have been described in conjunction with some manner of closed functionally or physically separable cabinet or functionally or physically segregated discrete facility, the systems and methods according to this disclosure are not limited to such applications. Rather, the systems and methods may be applied in any situation where replaceable components may be stored in such a manner that an internal or externally mounted component monitoring module may be powered and read from, and optionally written to, and data regarding a status of an available or in-use supply of on-hand replaceable components and at least one measurable and/or monitorable characteristic of the replaceable components may be, in turn, externally communicated to at least one remote node, such as, for example, a supply center. Such applications may include an entire room in a facility being wired with exemplary components such as those shown in FIG. 1, or floors and/or shelves in a garage or warehouse being so wired, or any other like installation.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A storage system, comprising:
    a storage unit that stores a replaceable component associated with a device, the storage unit being functionally separated from the device, wherein the stored replaceable component has an associated externally-readable monitoring module, the monitoring module monitoring at least a dynamic characteristic of the stored replaceable component and reporting the status of that characteristic;
    a data exchange interface for reading data from the externally-readable monitoring module while the stored replaceable component is stored in the storage unit, the data including information regarding the dynamic characteristic; and
    an external communications interface for interfacing with a communication path in order that information regarding the stored replaceable component, including the data read by the data exchange interface from the externally-readable monitoring module associated with the stored replaceable component, is transmitted to a receiving node that is external to the storage system, wherein
    the dynamic characteristic of the stored replaceable component is automatically updated to the receiving node.

2. The system of claim 1, wherein the storage unit comprises at least one of a cabinet, a room within a facility, a garage, a warehouse, a floor within a garage or a warehouse, or shelves.

3. The system of claim 1, wherein the dynamic characteristic is at least one of use information and remaining service life information.

4. The system of claim 1, wherein the monitoring module comprises a power device to provide power to the monitoring module.

5. The system of claim 4, further comprising a power interface, located external to the stored replaceable component, usable to transfer power from the system to the power device of the monitoring module.

6. The system of claim 5, wherein the power interface and the power device comprise complementary parts of at least one of an air core transformer or a photoelectric circuit.

7. The system of claim 1, wherein the data exchange interface comprises at least one of a wired, wireless or optical connection.

8. The system of claim 1, wherein the data exchange interface is usable to write information from the system to the monitoring module.

9. The system of claim 1, wherein the communication path comprises at least one of a telephone line, a network interface, or an Internet communication interface.

10. The system of claim 1, further comprising a user interface usable to allow a user in proximity to the system to at least one of monitor status of the system, modify control of the system or review data available in the system.

11. The system of claim 1, further comprising at least one data storage device that stores at least one of status information or control information for the system, replaceable component inventory data, or external communications and control information associated with the external communications interface.

12. The system of claim 1, further comprising a controller usable to cause the system to at least one of update or transmit stored replaceable component inventory information, based on at least one of (a) a time or date schedule, (b) an indication of change in inventory status, (c) a local user initiated system request, or (d) a request initiated by at least one receiving node.

13. The system of claim 1, wherein the at least one receiving node comprises a replaceable component supply facility.

14. The system of claim 1, wherein the stored replaceable component is associated with an image forming device.

15. The system of claim 1, wherein the stored replaceable component is a customer replaceable unit associated with a xerographic image forming device.

16. The system of claim 15, wherein the monitoring module is a customer replaceable unit monitor associated with a customer replaceable unit for a xerographic image forming device.

17. The system of claim 15, wherein the customer replaceable unit is an image producing medium holding component.

18. The system of claim 17, wherein the image producing medium holding component holds at least one of ink or toner.

19. A method for monitoring a replaceable component inventory associated with a device, comprising:
    storing, within a storage unit, a replaceable component, the replaceable component having an associated monitoring module for monitoring at least a dynamic characteristic of the replaceable component, the monitoring module being externally readable by a data exchange interface that is separate from the replaceable component, and that is associated with the storage unit;
    collecting data from the component monitoring module regarding the dynamic characteristic of the stored replaceable component while the stored replaceable component is stored in the storage unit;
    compiling information regarding the stored replaceable component including the collected data regarding the dynamic characteristic of the replaceable component; and
    transmitting the compiled information to at least one receiving node, that is external to the storage unit, via an external communications interface, wherein
    the dynamic characteristic of the stored replaceable component is automatically updated to the receiving node.

20. A computer-readable digital data storage medium on which is stored a program for causing a computer to implement the method of claim 19.

* * * * *